United States Patent [19]

Asaka et al.

[11] 4,406,269

[45] Sep. 27, 1983

[54] APPARATUS FOR LIQUID SUPPLY IN INTERNAL COMBUSTION ENGINE

[75] Inventors: Urataro Asaka, Kamifukuoka; Akira Suzuki, Niiza; Kiyoshi Kimura, Kiyose, all of Japan

[73] Assignee: Honda Giken Kogyo Kabushiki Kaisha, Tokyo, Japan

[21] Appl. No.: 228,695

[22] Filed: Jan. 27, 1981

[30] Foreign Application Priority Data

Jan. 29, 1980 [JP] Japan ................................. 55-8254

[51] Int. Cl.³ .............................................. F02M 31/00
[52] U.S. Cl. .................................... 123/549; 261/142; 219/207; 123/557
[58] Field of Search ............... 123/557, 549, 73 AD; 261/142; 219/205, 206, 207

[56] References Cited

U.S. PATENT DOCUMENTS

| | | | |
|---|---|---|---|
| 1,202,771 | 10/1916 | Babbitt | 261/142 |
| 1,276,169 | 8/1918 | Buchmann | 261/142 |
| 3,851,633 | 12/1974 | Shih | 123/127 |
| 4,057,041 | 11/1977 | Sakai | 123/73 AD |
| 4,177,778 | 12/1979 | Naitou | 123/557 |
| 4,212,275 | 7/1980 | Inoue | 123/557 |

*Primary Examiner*—Ronald H. Lazarus
*Attorney, Agent, or Firm*—Armstrong, Nikaido, Marmelstein & Kubovcik

[57] ABSTRACT

An apparatus for liquid supply in an internal combustion engine having a liquid chamber containing a liquid such as fuel, lubrication oil or the like and located at one side of an intake passage of the internal combustion engine, which liquid chamber is in communication with the intake passage through a delivery passage having a metering throttle interposed therein; and a heating means provided proximately to the throttle portion of the delivery passage.

7 Claims, 12 Drawing Figures

APPARATUS FOR LIQUID SUPPLY IN INTERNAL COMBUSTION ENGINE

BACKGROUND OF THE INVENTION

This invention relates to an apparatus for supplying liquid such as liquid fuel such as gasoline, alcohol or the like, or lubrication oil, etc. to the interior of an intake passage of an internal combustion engine.

There has been known apparatus of this kind in which a liquid chamber containing liquid such as gasoline or the like is provided at the side of an intake passage in an internal combustion engine, and the chamber is in communication with the intake passage through a delivery passage having a metering or throttle portion interposed therein, so that when there is generated a negative pressure in the intake passage, the liquid is sucked by the negative pressure into the intake passage through the delivery passage. It is usual with this type that the flow rate of the liquid introduced thereto will depend on the throttle size of the throttle portion, the difference between the pressures of the front side and the rear side thereof, and the viscosity of the liquid. Therefore, if the viscosity of the liquid is increased with lowering of a temperature, the flowing rate thereof tends to be decreased accordingly, but this is not desirable. Namely, in the case where the liquid is such fuel as gasoline, alcohol or the like, for instance, the starting characteristic of the engine, the driving property of the vehicle, the fuel consuming cost and others at the time of low temperature are liable to be unfavorable, and in the case where the liquid is lubrication oil, for instance, this may cause such an inconvenience that oil distribution becomes bad and the friction loss is increased.

SUMMARY OF THE INVENTION

This invention has for its object the provision of an apparatus free from the inconveniences of the prior art. More particularly, an apparatus having a liquid chamber containing liquid such as liquid fuel or lubrication oil is provided by the side of an intake passage in an internal combustion engine, and the liquid chamber is in communication with the intake passage through a delivery passage having a metering throttle portion interposed therein. This is characterized in that the delivery passage is provided at the throttle portion or at the upstream side thereof including heating means provided proximately to the throttle portion of said delivery passage.

DETAILED DESCRIPTION OF THE INVENTION

Figure 1:
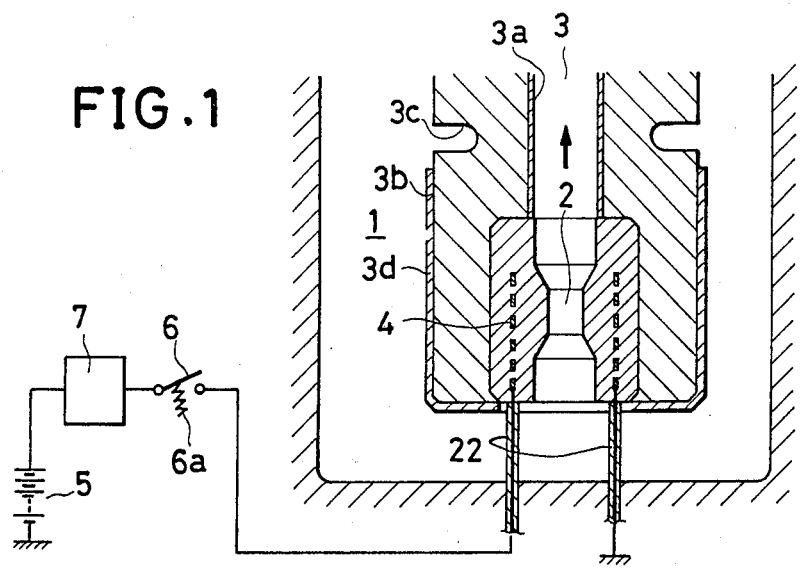
FIG. 1 is a sectional side view of an important portion of one embodiment of the invention.
Figure 2:
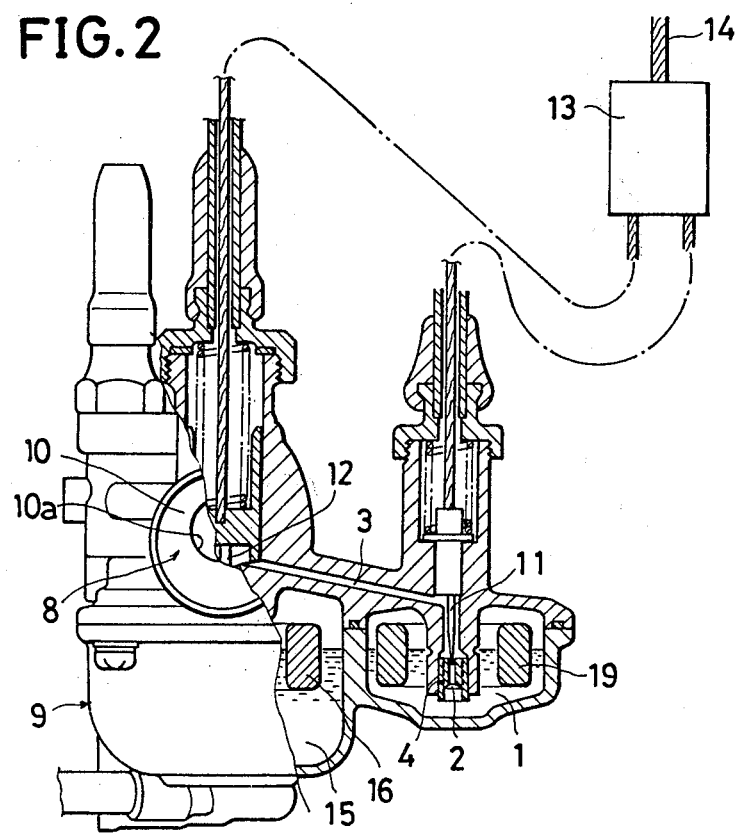
FIG. 2 is a side view, partly in section, of another embodiment of the invention.
Figure 3:
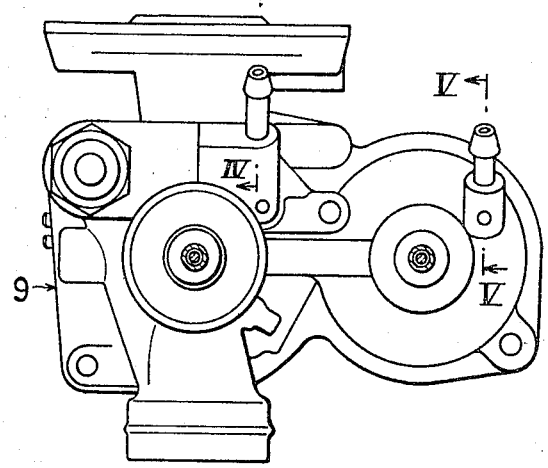
FIG. 3 is a top plan view of the embodiment of FIG. 2.
Figure 4:
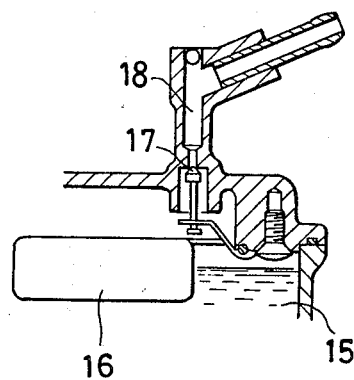
FIGS. 4 and 5 are sectional views taken along the lines IV—IV and V—V FIG. 3.

Embodying examples of this invention will now be set forth with reference to the accompanying drawings:

Referring to FIG. 1, illustrating one embodiment of this invention, element 1 denotes a liquid chamber containing liquid such as liquid fuel, lubrication oil or the like and the liquid chamber 1 is in communication through a delivery passage 3 having a metering throttle portion 2 interposed therein, with an intake passage in an internal combustion engine (not illustrated), so that a negative pressure is generated in the intake passage, the liquid in the liquid chamber 1 may be drawn by the negative pressure introduced into the intake passage through the delivery passage 3. In other words, the whole of the elements 1, 2 and 3 may serve as a carburetor for a fuel supply in an internal combustion engine or an apparatus for supply of lubrication oil in a two-cycle internal combustion engine.

The above is not especially different from a conventional engine. According to this invention, the delivery passage 3 is provided at the throttle portion 2 or on the upstream side thereof with a heater such as an electric one or the like for heating so that when the liquid is being supplied through the delivery passage 3 the same may be heated by the heater 4 and be lowered in its viscosity.

This will be explained more in detail with reference to the illustrated example, as follows:

The delivery passage 3 is constructed of a metal pipe of which the thickness is comparatively large, and an inner annular surface 3a thereof is provided with a heat insulation material such as ceramic or the like; an outer annular surface 3b thereof is formed with a thermal conduction cut-off groove 3e which is applied with a heat insulation material 3d. The throttle or restricted portion 2 is of a metering jet type, one as is used in a conventional carburetor; the heater 4 is formed by printing or the like as a coil-shaped electric type, one of tungsten or the like on the inner annular surface or in the interior of the throttle portion as illustrated. The heater 4 may for instance, be composed of a semi-conductor heater or a temperature controlled type, one combined with a DN junction diode having a Pertier effect.

The heater 4 is constructed to be an electric type one, for instance, as illustrated, and is connected to an electric power source 5 such as a battery or the like mounted on a vehicle, and there is interposed in its connecting circuit a key switch 6 which is arranged to be closed against the action of a return spring 6a by insertion of an ignition key or by moving thereof to its operative position, and thus the heater 4 can be energizing only when the key is inserted or is moved to its operative position; thereby, an electric power loss can be eliminated. It is preferable in this case that, though not illustrated, the key is so arranged that the same is returned automatically to its inoperative position, or its pulled-out position, on detecting a stop of the engine by a sensing mechanism.

It is additionally preferably that, though not illustrated, a temperature detecting means such, as a thermistor or the like, be provided in the delivery passage 3 and the electric current flowing through the heater 4 is so controlled thereby that the temperature of the liquid flowing through the passage 3 may be kept always almost constant. Numeral 7 denotes a control circuit for this purpose.

Instead of the thermistor or the like, a construction can be considered such that the temperature of the liquid is detected from the amount of the electric current flowing through the heater 4, so that the heat generating amount of the heater 4 is controlled. It is in general that the control temperature is 40°-50° C. where the liquid is gasoline or lubrication oil and is 60°-70° where the same is alcohol.

The operation of the apparatus of this example is as follows:

If the ignition key is inserted or is further turned to its operative position, the key switch 6 is closed, so that the heater 4 is connected to the electric source 5 and is operated. Thus, the liquid being drawn to flow through the delivery passage 3 into the intake passage by the negative pressure is heated by the heater 4 at the restricted metering portion 2 or the upstream side thereof to reach a predetermined temperature, that is, the foregoing 40°-50° C. or 60°-70° C., for instance. Consequently, the liquid is lowered in its viscosity according to rise in temperature, and the flowing rate thereof is always kept to be a predetermined value, and thus the foregoing inconvenience in the conventional one wherein the flowing rate is decreased can be removed. On this occasion, the heating of the liquid is carried out only partially, so that large electric power is not required, and a conventional battery is sufficient as the power source.

FIGS. 2 to 6 show another embodiment of this invention, this embodiment serving as an apparatus for supply of lubrication oil in a two-cycle internal combustion engine.

Referring to FIGS. 2 to 6, element 8 denotes an intake passage in a two-cycle internal combustion engine; the passage 8 is provided with a carburetor for supply of fuel; the liquid chamber 1 is composed of an oil chamber containing lubrication oil, while the chamber 1 is in communication with a carburetor passage 10 in the carburetor 9 through the delivery passage 3. The passage 3 is provided with both the restricted metering portion 2 and the heater 4 in almost the same manner as in the prior embodiment and, in almost the same manner, the restricted metering portion 2 is made of ceramics and the electric heater 4 is embedded therein.

Figure 5:
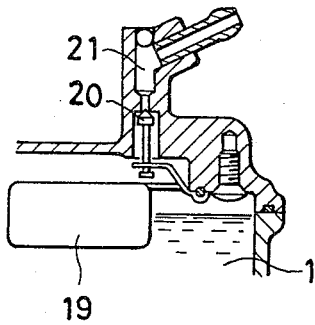
Figure 6:
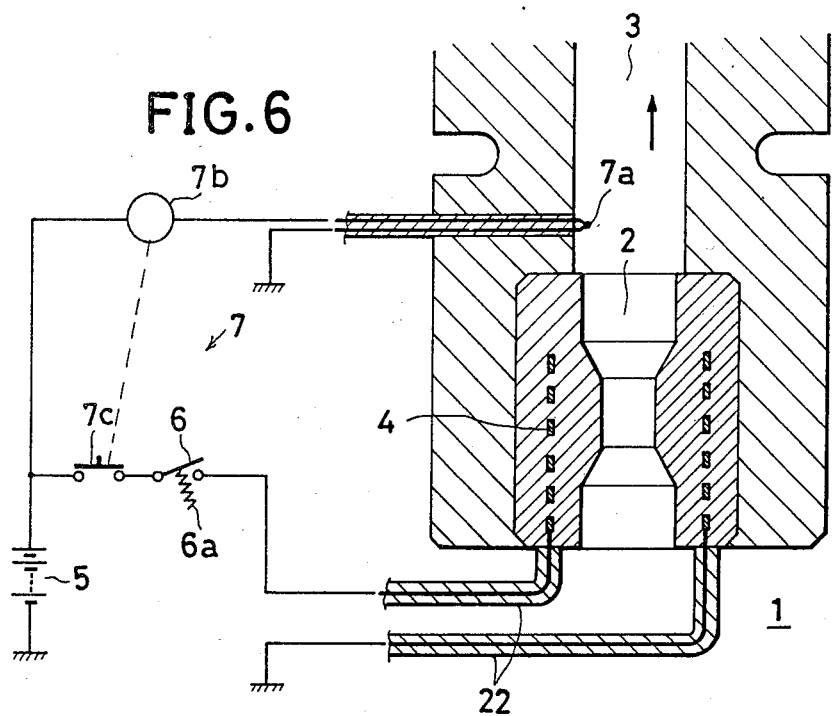
FIG. 6 is an enlarged sectional side view of an important portion of the embodiment of FIG. 2.
Figure 7:
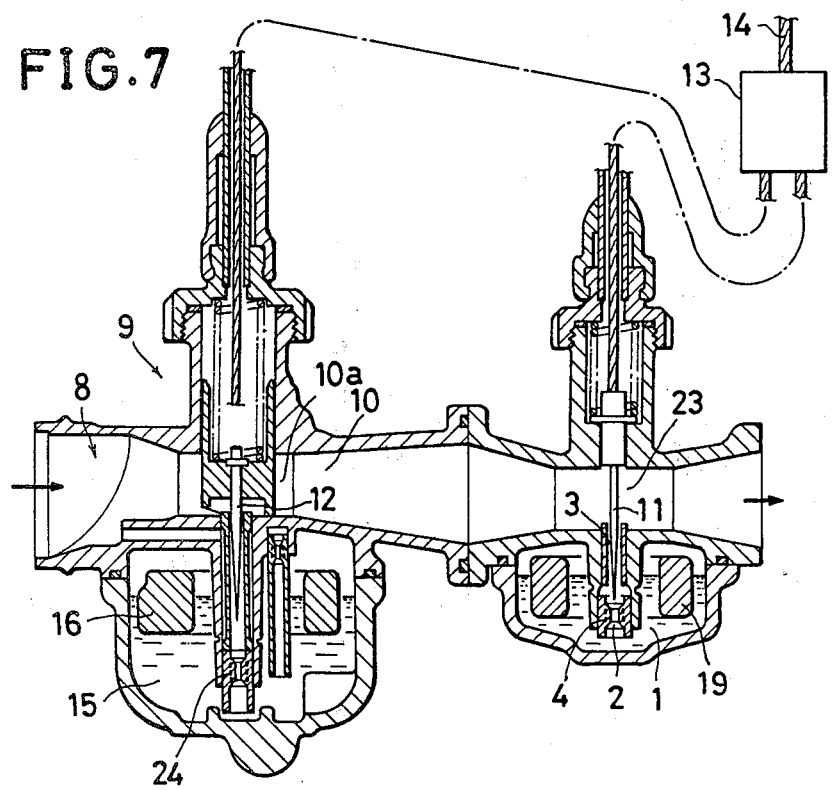
FIG. 7 is a sectional view of a modification of the embodiment of FIG. 2.
Figure 8:
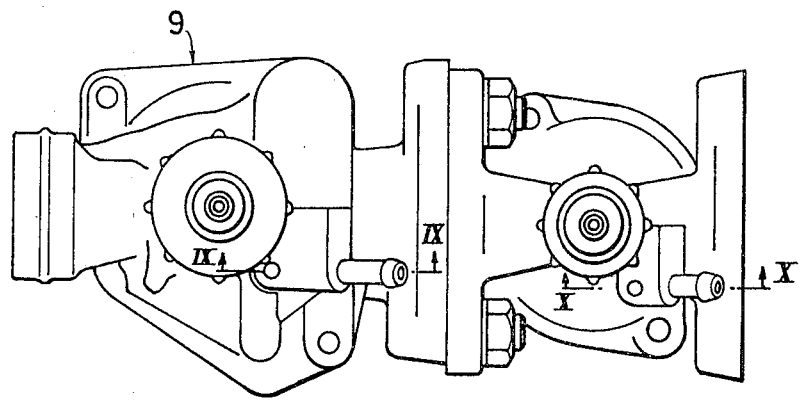
FIG. 8 is a top plan view thereof.
Figure 9:
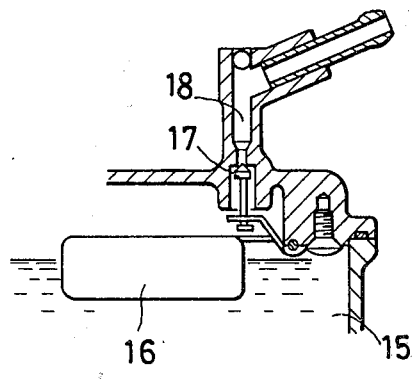
FIGS. 9 and 10 are sectional views taken along the line IX—IX and X—X of FIG. 7.
Figure 10:
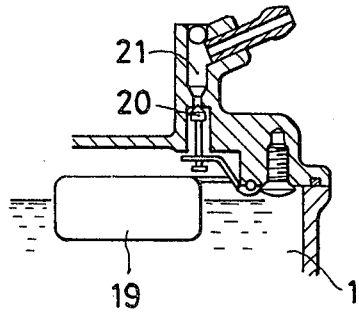

In this embodiment the restricted metering portion 2 is provided with a needle valve 11 inserted therein and the valve 11 is connected, together with a needle valve 12 in the carburetor 9, to a single common acceleration wire 14 through a junction 13. It is desirable, though not illustrated, that the carburetor 9 is also provided at its main jet portion with a heater. The foregoing carburetor passage 10 is provided with a venturi portion 10a, and the delivery passage 3 is arranged to open in the venturi portion 10a. Numeral 15 denotes a float chamber of the carburetor 9, and as shown clearly in FIG. 4, the chamber 15 is provided with a float 16 and a float valve 17 so that a fuel supply opening 18 may be opened and closed by the valve 17. This is the case with the oil chamber 1; as shown in FIG. 5, the chamber 1 is provided with a float 19 and a float valve 20 so that a lubrication oil supply opening 21 may be opened and closed by the valve 20. As shown in FIG. 6, the foregoing heater 4 is connected to the electric source 5 through the key switch 6 and a control circuit which includes a contact 7c of a relay 7b arranged to be operated by a temperature detector 7a, and a covered wire 22 for connection.

The operation of the above embodiment is as follows:

When a negative pressure is generated in the intake passage 8, the fuel in the float chamber 15 of the carburetor 9 is drawn thereto and thus the supply of fuel is performed. The negative pressure acts also on the oil chamber 1 and the oil in the same is drawn thereby, and thus supply of lubrication oil is also achieved. At that time also, the lubrication oil is heated by the heater 4 and the viscosity thereof becomes substantially constant and, thus, an accurate measuring can be carried out.

Thus, in this example, the fuel and the lubrication oil are both drawn by the negative pressure generated in the intake passage 8 so as to be supplied, and a predetermined mixture gas can be obtained simply and reliably.

FIGS. 7 to 10 show a further embodiment thereof, wherein the intake passage 8 is provided therein with a negative pressure generating portion 23 such as a subsidiary venturi or the like which is disposed in series with the foregoing venturi portion 10a, and the oil chamber 1 is in communication through the passage 3 with that portion 23.

Figure 11:
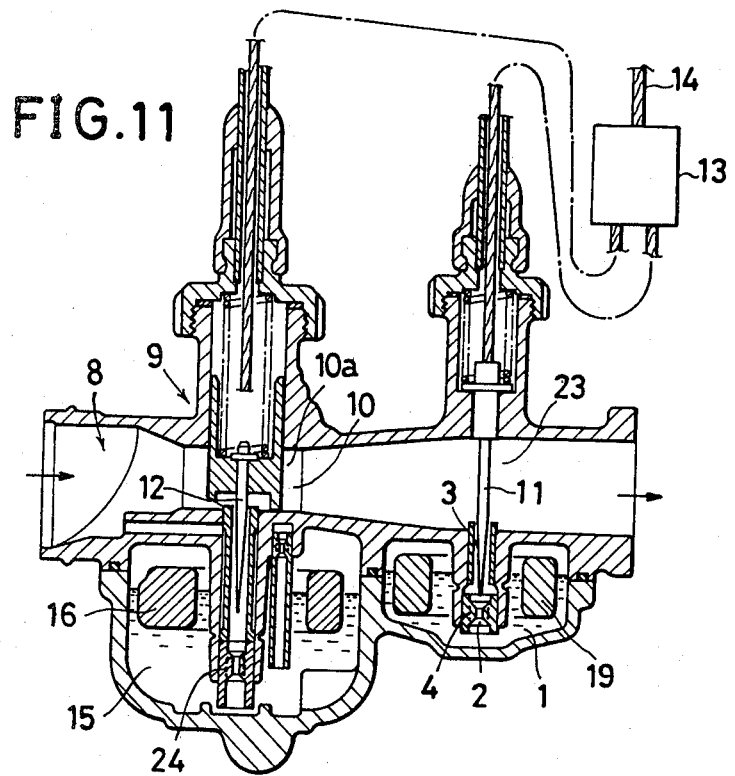
FIG. 11 is a sectional side view of a second modification of the embodiment of FIG. 2.
Figure 12:
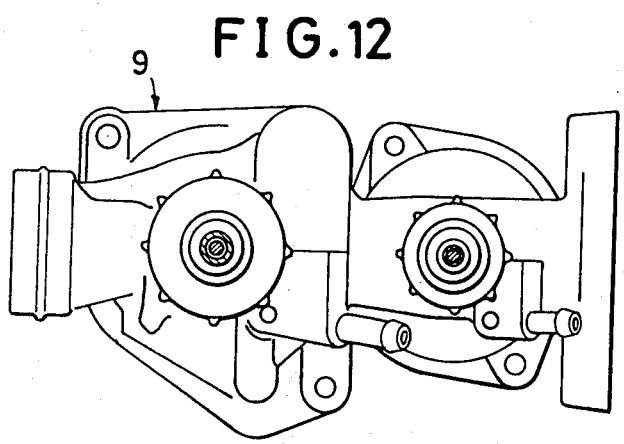
FIG. 12 is a top plan view of the same.

In the embodiment of FIGS. 7 to 10, the oil chamber 1 is constructed separate and apart from the carburetor 9. Alternatively, the same may be constructed as one integral unit as shown in the embodiment of FIGS. 11 and 12.

The negative pressure generating portion 23, that is, the subsidiary venturi, is positioned nearer to the engine side than the venturi 10a of the carburetor 9.

The carburetor 9 is also provided at its main jet portion with a heater 24. The remainder parts thereof are not different from those in the foregoing example.

The operation of the apparatus of this further embodiment is as follows:

The carburetor 9 serves to supply fuel through the venturi 10a by the action of the negative pressure generated in the intake passage 8 and, at that time, the negative pressure in the intake passage 8 acts at the subsidiary venturi 23 to draw the oil contained in the oil chamber 1, and on this occasion the drawn oil is heated by the heater 4 when passing the delivery passage 3 and the viscosity thereof becomes nearly constant and an accurate measuring thereof can be obtained and, thus, the air-fuel mixture is led to the engine together with lubrication oil of a corresponding amount.

Many modifications and variations of the present invention are possible in light of the above teachings. It is, therefore, to be understood that within the scope of the appended claims, the invention may be practiced otherwise than as particularly described.

What we claim is:

1. An apparatus for supplying a liquid in an internal combustion engine, said engine having an intake passage, said apparatus comprising:
    a liquid chamber containing a liquid having a level, said chamber having an inlet supply opening and an interior,
    a float in said chamber,
    a float valve connected to said float and arranged to open and close said inlet supply opening depending on said level,
    a delivery passage which is open at one end to said intake passage and at its opposite end to said interior of said liquid chamber below said level, a restricted metering jet portion in said delivery passage having an upstream end lying in or protruding through the plane of said opposite end for metering liquid passing therethrough from said liquid chamber, said restricted metering jet portion being made of ceramics, and means for electrically heating said restricted metering jet portion, said means for heating including a battery of said engine, a key switch of said engine, an electric heater in said restricted metering jet portion, and means for electrically interconnecting said battery, key switch, and electric heater.

2. The apparatus as recited in claim 1, wherein the engine is:

a two-cycle internal combustion engine having said intake passage provided with a carburetor for supply of fuel;

said liquid chamber is an oil chamber containing lubrication oil; and said oil chamber is in communication, through said delivery passage, with a carburetor passage in the carburetor.

3. The apparatus as recited in claim 1, wherein the engine is:

a two-cycle internal combustion engine having said intake passage provided with a carburetor for supply fuel through a venturi portion thereof;

said liquid chamber is an oil chamber containing lubrication oil; and said oil chamber is in communication, through the delivery passage, with a negative pressure generating portion disposed in the intake passage in series with said venturi portion.

4. The apparatus as is recited in claim 3 in which said negative pressure generating portion comprises a subsidiary venturi.

5. The apparatus as recited in claim 2 or 3, in which the restricted metering jet portion includes a needle valve inserted therein, the needle valve being connected, together with a needle valve in the carburetor, to a single common acceleration wire through a junction.

6. The apparatus as recited in claim 1, wherein said opposite end of said delivery passage is thermally insulated from said liquid in said liquid chamber.

7. The apparatus as recited in claim 1, wherein said means for heating further includes means for sensing the temperature adjacent said restricted metering jet portion, and means connected to said means for sensing and said electric heater for controlling the temperature of said restricted metering jet portion.

* * * * *